May 10, 1960   LE ROY F. ENGLISH ET AL   2,936,441
VEHICULAR ROTATING WARNING BEACON LIGHT
Filed Dec. 16, 1957
2 Sheets-Sheet 1
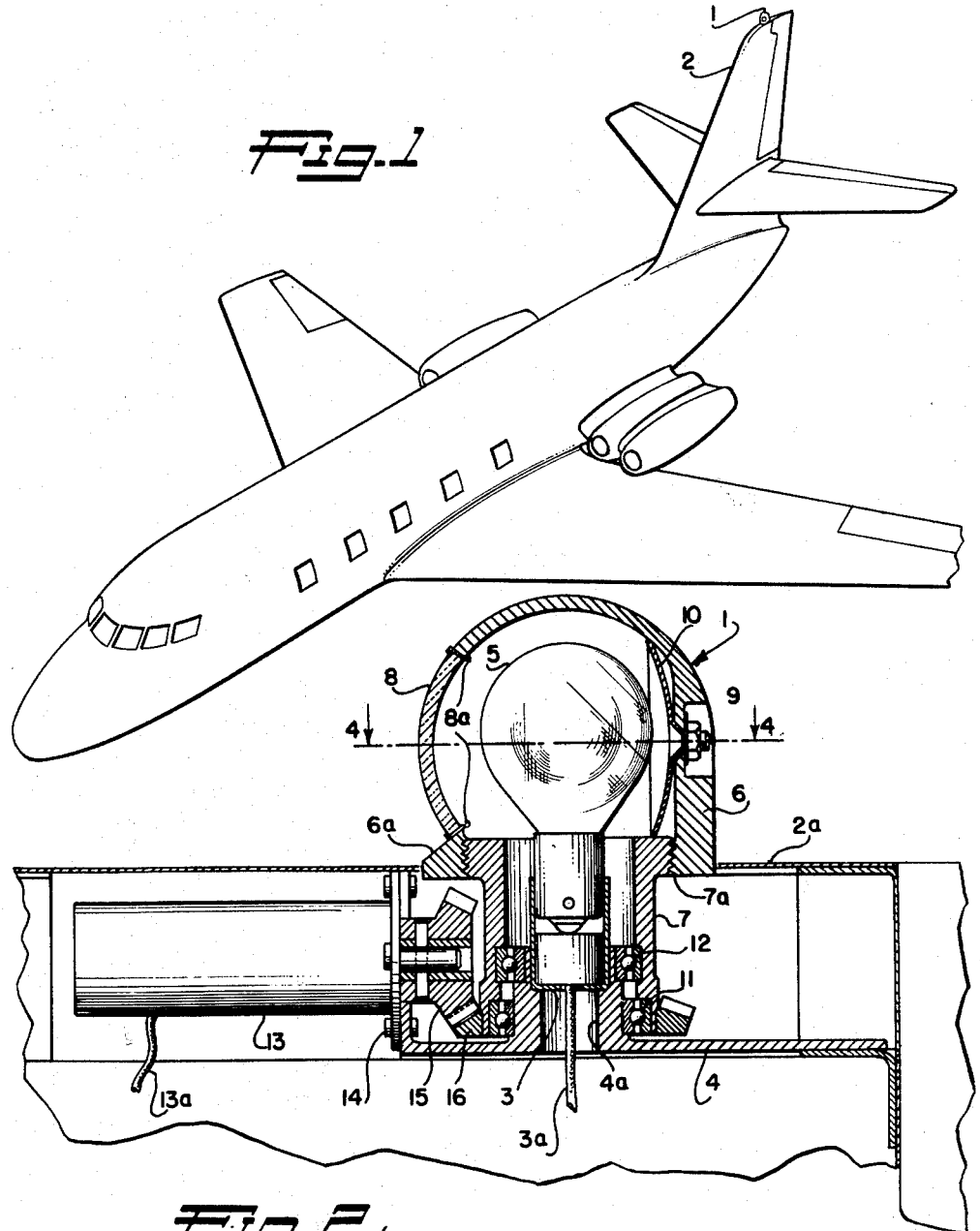
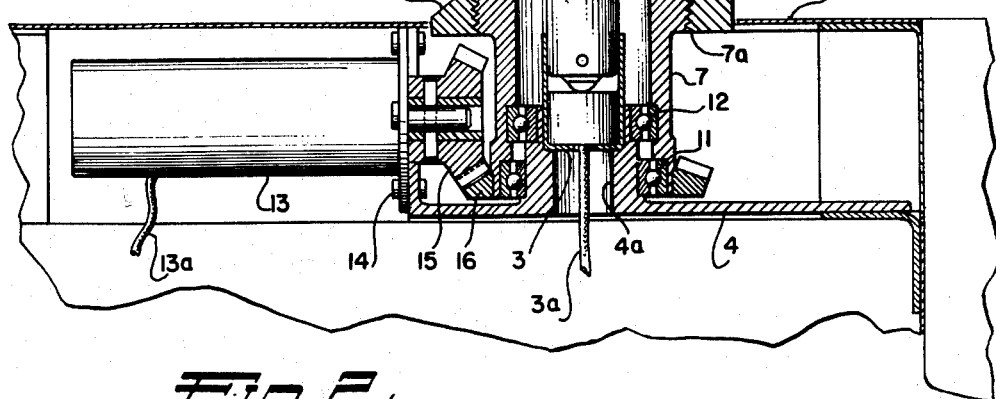
INVENTORS
LE ROY F. ENGLISH
ELMER C. WILLOUGHBY JR.
By *George C. Sullivan*
Agent May 10, 1960 LE ROY F. ENGLISH ET AL 2,936,441
VEHICULAR ROTATING WARNING BEACON LIGHT
Filed Dec. 16, 1957 2 Sheets-Sheet 2

INVENTORS
LE ROY F. ENGLISH
ELMER C. WILLOUGHBY JR.
By George C. Sullivan
Agent

# United States Patent Office 2,936,441
Patented May 10, 1960

2,936,441
VEHICULAR ROTATING WARNING BEACON LIGHT

Le Roy F. English, Northridge, and Elmer C. Willoughby, Jr., Encino, Calif., assignors to Lockheed Aircraft Corporation, Burbank, Calif.

Application December 16, 1957, Serial No. 702,857

6 Claims. (Cl. 340—50)

This invention relates to vehicular rotating warning beacon lights, and more particularly to a rotating warning beacon or anti-collision light for aircraft as required by the Civil Aeronautics Authority Civil Air Regulation 42.22(b)(2).

The increase in air traffic in recent years has caused the advent of a device known as an anti-collision warning light for safety reasons. A large portion of such lights are usually mounted externally of the aircraft structure, whether mounted on the upper or lower sides of the aircraft fuselage or on the uppermost portion of the vertical stabilizer of the empennage, and are usually constructed so as to create a flashing red light to a person in line of sight of the light and removed therefrom. This flashing effect has heretofore been created by a lamp and reflector rotating within an outer housing, or having a reflector rotating around a stationary lamp, both the reflector and the lamp contained in an outer housing. The rotary driving means for the lamp and reflector, or for the reflector by itself as will be the case when using a stationary lamp, is usually located within the outer housing or in a position so as to increase the size of the outer housing.

Because of the light's external location to the aircraft structure proper, it is subject to the air flow over the aircraft surfaces and interrupts such flows creating aerodynamic drag. Such aerodynamic drags are substantially increased by a large outer housing relative to the size of the lamp or reflector, which is usually caused by the inclusion of rotation driving means for the lamp and/or reflector therein. Reduction of the total aerodynamic drag can be accomplished by the addition of fairing structures around the outer housing. However, the extent that fairings may be used is limited in that the flashing light should be visible through a 360° horizontal plane.

Additional difficulties are presented if the warning light is of the type using a rotating lamp and reflector in that rotating electrical contacts or brushes must be incorporated to supply electrical power to the lamp proper, which is an occasional source of mechanical operational and assembly difficulties.

Accordingly, it is an object of this invention to provide a rotating beacon warning light through a 360° horizontal plane that is compact and has little protuberance from the structure to which it is mounted.

A further object of this invention is to provide a rotating beacon warning light serving as an anti-collision warning light for aircraft having small aerodynamic disturbance and drag.

A still further object of this invention is to provide a rotating beacon warning light whose beam can be rotated 360° in a horizontal plane without necessitating rotating electrical contacts or brushes for the lamp.

Still another object of this invention is to provide a rotating beacon warning light for aircraft wherein replacement of the lamp is relatively easy without substantial disassembly to accomplish such replacement.

A further object of this invention is to provide a warning light of the type described for aircraft that is of light weight and contains few parts of simple and inexpensive construction.

Other objects and advantages will become apparent from the following description taken in connection with the accompanying drawings in which:

Figure 1 shows an aircraft having a light of the type described herein;

Figure 2 is a cross-sectional view of a rotating warning light assembly of the type shown in Figure 1;

Figure 3:
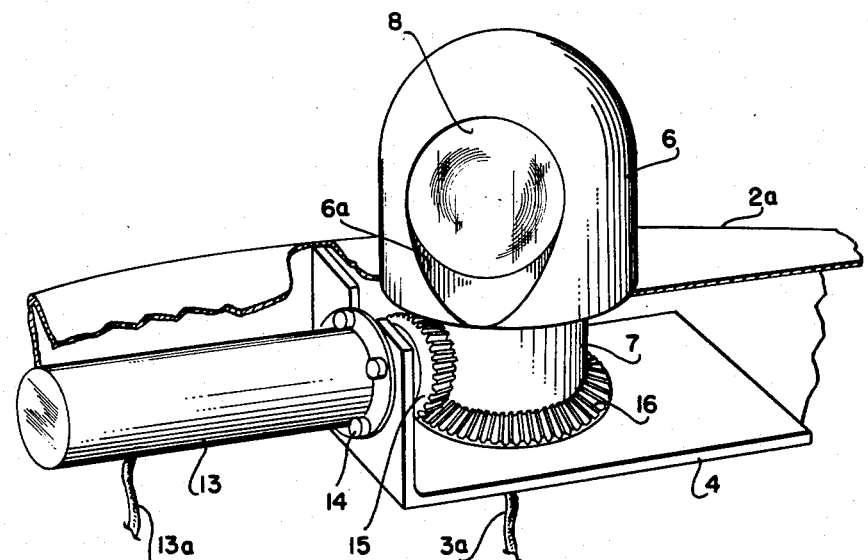
Figure 3 is an oblique view showing the connection between the rotating outer housing and driving means therefor.

Generally stated, the invention is practiced in one embodiment by rotatively mounting a housing containing a reflector and lens around a stationary lamp and socket. In the aircraft use disclosed herein, the portion of the housing that protrudes from the outer aircraft surface is just sufficient to accommodate the size of lamp used, while the rotation driving means is located inside the aircraft structure and external of the recessed portion of the housing relative to its axis of rotation.

Referring more particularly to the drawings, Figure 1 depicts one embodiment of this invention of a lamp or light assembly 1 being mounted atop the vertical stabilizer of an airplane, the light assembly 1 serving as an anti-collision warning light as required by the Civil Aeronautics Authority, Civil Air Regulation 42.22(b)(2), as referred to above. As can be seen from this view, the amount of protuberance of light assembly 1 from the outer surface of the aircraft structure is quite small, which is desirable in that the smaller the protuberance the less aerodynamic drag that will result.

As shown in Figure 2, the light assembly 1 comprises a stationary lamp socket 3 mounted in a tubular boss 4a of base 4, base 4 being mounted internally of the outer surface 2a of the vertical stabilizer 2. Electrical conductor 3a connects the lamp socket 3 to the aircraft electrical system for supplying current to lamp 5 mounted in socket 3.

The assembly housing consists of a calathiform lamp housing member 6 secured to a tubular mounting or extension member 7 by threaded connection 7a. Lamp housing member 6 has a side opening therein in which is placed a lens 8 which may be of any suitable lens material such as glass, plastic, etc., and may be of any preferred color, such as the color red which would be used in the utilization of this lamp as an anti-collision warning device. Diametrically opposite the centerline of lens 8 there is a counterbore 9 on the outer surface of lamp housing 6. The purpose of counterbore 9 is to provide a recessed location for the shank end of a bolt passing through lamp housing 6 and a nut and washer associated therewith for securing a light reflector 10 on the inner surface of lamp housing 6 in a position diametrically opposite the centerline of lens 8. It is to be understood that the use of a nut and bolt means for connecting reflector 10 to lamp housing 6 is not a limitation as any type of suitable fastening means may be employed.

Lens 8 is maintained in its proper position in the opening in lamp housing member 6 by a plurality of small clips 8a, although any other suitable mounting or securing means may be used.

Lamp housing 6 and tubular member 7 is rotatably mounted on tubular boss 4a of base 4 by two rotary bearings 11 and 12 located between the outer surface of tubular boss 4a and the inner surface of tubular member 7. Rotation of lamp housing 6 and tubular member 7 is accomplished by a small electric motor 13, having an electrical conductor 13a connected to the aircraft electrical system, and mounted to base 4 by any suitable connecting or fastening means which is indicated by the numeral 14 in the drawings. Mounted on the shaft of motor 13 is a small bevel pinion 15 for driving bevel ring gear 16 which is secured or mounted circumferentially around the outer surface of tubular member 7.

Figure 4:
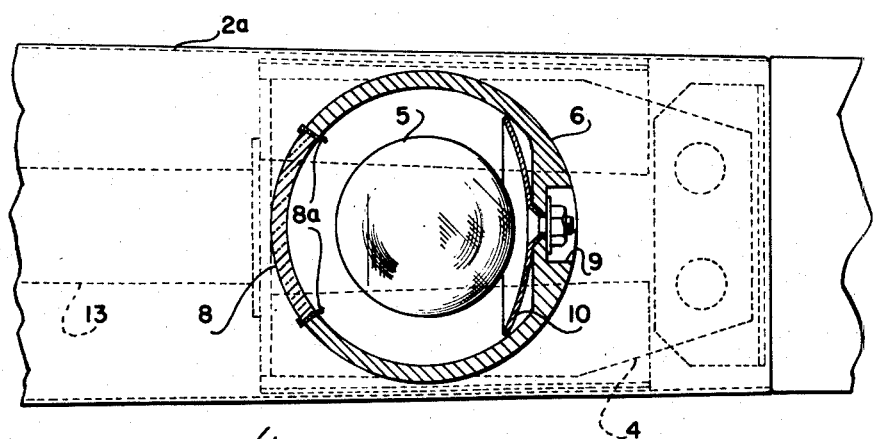
Figure 4 is a view taken along line 4—4 of Figure 2.

Referring to Figures 3 and 4 in combination with Figure 2, it can be seen that lens 8 is shaped spherically symmetrical about its center so as to allow the warning light to be visible from a line of sight having an angle of incidence with the center of lens 8 of at least 38°. Thus, if the line of sight was horizontally coplanar with the center of lens 8, the duration of the flashing light would be the time for the lamp housing member 6 and tubular member 7 to rotate through an angle of twice the spherical arcuate angle of extent of the lens from its center, or 76°. A shorter time duration of visible light flash will occur if the line of sight is located above or below the horizontal axis of the center of lens 8, the maximum vertical angle that the line of sight can be removed from such horizontal plane being at least 38°. In order to accomplish visibility of the flashing light through the angles discussed above, the lowermost portion of the opening in lamp housing 6 has a tapered surface as indicated by 6a in Figures 2 and 3. The tapered surface 6a is only required where a portion of lamp housing member 6 would protrude or extend beyond the spherical outer surface of lens 8.

In operation, when it is desired to have a flashing warning signal, conductors 3a and 13a are connected to an electrical source whereupon lamp 5 becomes lit and motor 13 turns bevel pinion gear 15 in driving engagement with bevel ring gear 16 causing lamp housing member 6 to rotate about a vertical axis while lamp 5 is stationary. Reflector 10 serves to intensify the light beam passing through lens 8, the light beam appearing to be of the flashing kind to a person at a fixed line of sight from the rotating housing. With this construction, rotating electrical contacts or brushes for the lamp socket 3 are not required and thus a source of operating difficulties is eliminated.

Replacement of a burned-out lamp 5 is accomplished quite readily by merely unscrewing housing member 6 from tubular member 7, replacing lamp 5 with a new one, and reassembling by reconnecting members 6 and 7 by threads 7a. Thus replaceability of lamp 5 is accomplished with little disassembly. Also, it should be noted that with this type of assembly, the size of the lamp housing member 6 can be dependent on the size of lamp 5 used. Furthermore, the size of lamp 5 also controls the amount of calathiform protuberance from the outer surface of the aircraft structure.

As can be seen, this invention provides a small and compact anti-collision warning light for aircraft in which there is a minimum protuberance from the outer surface of the aircraft structure, the balance of the assembly being recessed within the aircraft structure. By having the protuberance a small calathiform, little aerodynamic drag is generated by the air flow over the outer surface of the aircraft structure. Furthermore, by having the recessed portion of the device small and compact, there is no need for the necessity of bulbous interruptions of the outer surface of the aircraft structure requiring a fairing extending beyond the outer surface of the aircraft structure.

While a particular embodiment of the invention has been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A flashing rotary warning beacon light for a vehicle comprising a stationary lamp socket, a lamp in said socket, a housing assembly, said housing assembly rotatably mounted around said socket and lamp and containing a lens and reflector, motor means for rotating said housing assembly around the lamp and socket, said motor means located radially outside the housing assembly, and means connecting said motor to said housing assembly for rotationally driving substantially through a right angle the housing assembly to create a flashing light appearance to a viewer as the lens passes between the viewer and lamp as said housing assembly rotates.

2. A flashing rotary warning beacon light for a vehicle comprising a stationary lamp socket, a lamp in said socket, a tubular member rotatably mounted around said lamp socket and having gear teeth at one end thereof, a lamp housing connected to the other end of said tubular member, said lamp housing containing a lens and reflector, motor means for rotating the tubular member and lamp housing around the lamp and socket, said motor means located radially outside of the tubular member and lamp housing, and gear means connecting said motor to the tubular member gear teeth for rotationally driving the lamp housing through the tubular member to create a flashing light appearance to a viewer as the lens passes between the viewer and lamp as said lamp housing rotates.

3. An aircraft flashing rotary warning beacon light comprising a stationary lamp socket, a lamp in said socket, a housing assembly having a calathiform end, said housing assembly rotatably mounted around said lamp socket and lamp and containing a lens and reflector, motor means for rotating said housing assembly around the lamp and socket, said motor means located radially outside the housing assembly, and means connecting said motor to said housing assembly for rotationally driving said housing assembly to create a flashing light appearance to a viewer as the lens passes between the viewer and lamp as said housing rotates, said light mounted in such a manner whereby the only protuberance therefrom is a portion of the housing assembly calathiform end.

4. An aircraft mounted flashing rotary warning beacon light comprising a stationary lamp socket, a lamp in said socket, a tubular member rotatably mounted around the lamp socket and having gear teeth at one end thereof, a calathiform lamp housing connected to the other end of said tubular member, said lamp housing containing a lens and reflector, motor means for rotating the tubular member and lamp housing around the lamp and socket, said motor means located radially outside the tubular member, and gear means connecting said motor to said tubular member gear teeth for rotationally driving said lamp housing through said tubular member to create a flashing light appearance to a viewer as the lens passes between the viewer and lamp as said lamp housing rotates, said light mounted in such a manner whereby the only protuberance therefrom is a calathiform portion of said lamp housing.

5. A flashing rotary warning beacon light for a vehicle comprising a stationary lamp socket, a lamp in said socket, a tubular member rotatably mounted around said socket and extending at least the axial extent of said socket, said tubular member having gear teeth circumferentially at one end and a circumferentially threaded portion at the other end, a calathiform lamp housing having an internal threaded portion at the opening thereof and threadingly connected to the end of said tubular member, a lens and reflector in said lamp housing, electric motor means located radially outside the tubular member and lamp housing for rotating said tubular member and lamp housing around the lamp and socket, and gear means connecting said motor to the tubular member gear teeth for rotationally driving said lamp housing through said tubular member to create a flashing light appearance to a viewer as the lens passes between the viewer and lamp as said lamp housing is rotated.

6. A compact aircraft mounted flashing rotary warning beacon light comprising a stationary lamp socket, a lamp in said socket, a tubular member having an inner diameter smaller than the maximum diameter of said lamp rotatably mounted around said socket and extending at least the axial extent of said socket, said tubular member having gear teeth circumferentially at one end and a circumferentially threaded portion at the other end, a calathiform lamp housing having an internal threaded portion at the opening thereof and threadingly connected to the end of said tubular member, the size of said housing opening slightly larger than the maximum diameter of the lamp, a reflector mounted on the inner sidewall of said lamp housing, a passage through the housing wall diametrically opposite the reflector, a transparent lens mounted in the passage providing a light passage from the housing, an electric motor means located radially outside the tubular member and lamp housing for rotating said tubular member and lamp housing around the lamp and socket, and gear means connecting said motor to the tubular member gear teeth through a right angle drive for rotationally driving said lamp housing through said tubular member to create a flashing light appearance to a viewer as the lens passes between the viewer and lamp as said lamp housing is rotated, said light mounted in such a manner whereby the only protuberance from the aircraft is that portion of the housing sufficient to permit the light passage from the housing to be seen, the protruding portion of the housing being the calathiform end to minimize the aerodynamic drag therefrom.

References Cited in the file of this patent

UNITED STATES PATENTS

| | | |
|---|---|---|
| 1,238,220 | Thurber | Aug. 28, 1917 |
| 1,834,041 | Barton | Dec. 1, 1931 |
| 2,719,282 | Roth | Sept. 27, 1955 |
| 2,843,834 | Roth et al. | July 15, 1958 |

FOREIGN PATENTS

| | | |
|---|---|---|
| 418,309 | Germany | Sept. 2, 1925 |